United States Patent [19]

Horn et al.

[11] Patent Number: 5,728,417
[45] Date of Patent: Mar. 17, 1998

[54] METHOD FOR CONTROLLING CRYOGENIC FLOW IN A FOOD MIXING MACHINE

[75] Inventors: Darrell Horn; John M. Lennox, III; Greg Tapscott, all of Rohnert Park, Calif.

[73] Assignee: Blentech Corporation, Rohnert Park, Calif.

[21] Appl. No.: 664,635

[22] Filed: Jun. 17, 1996

[51] Int. Cl.⁶ ............................. A23P 1/00; G05D 23/00
[52] U.S. Cl. ............................. 426/231; 62/68; 426/519; 426/524
[58] Field of Search ............................. 426/231, 519, 426/524; 62/68, 231, 388; 99/517

[56] References Cited

U.S. PATENT DOCUMENTS

| | | | |
|---|---|---|---|
| 4,314,451 | 2/1982 | Leeds et al. | 62/68 |
| 5,104,232 | 4/1992 | Lennox | 62/68 |

*Primary Examiner*—George Yeung
*Attorney, Agent, or Firm*—Larry D. Johnson

[57] ABSTRACT

A cryogenic control system measures product temperature in a cryogenic food mixing machine such as a vacuum tumbler or agitator blender to determine the time it takes for the product to be chilled down to the point where the first cells of product start to freeze, and then stop the addition of cryogenic after a number of seconds beyond this point. By measuring the length of time it takes to chill the product down to the freezing point temperature, the proper forming point can be programmed as a multiple of this time.

3 Claims, No Drawings

METHOD FOR CONTROLLING CRYOGENIC FLOW IN A FOOD MIXING MACHINE

BACKGROUND OF THE INVENTION 1. Field of the Invention

The present invention provides a control method for determining the exact amount of cryogenic material such as liquid nitrogen or carbon dioxide "snow" required to be mixed into meat products in a cryogenic food mixing machine to freeze the meat until it is stiff enough to form efficiently. The inventive control system utilizes one or more methods to measure the temperature of the product and turn off the flow of cryogenic a predetermined time after this temperature has been reached. 2. Description of the Prior Art There is a large market for meat patties and other meat shapes made out of many small whole muscle pieces of meat formed together. During the removal of meat from the bones of beef or chicken, many small pieces of flesh are generated. These small pieces have much less value than the large fillet pieces. However, when these small pieces are formed together into larger shapes, the value per pound of meat increases dramatically. In order to form the small pieces together and have them stick together until they are cooked, it is necessary to freeze part of the meat to make it stiff.

In industrial processing plants, the freezing of the whole muscle meat pieces is typically accomplished with carbon dioxide snow or liquid nitrogen spray inside of a twin agitator meat blender or vacuum tumbler, such as those described in U.S. Pat. No. 5,104,232 and U.S. Pat. No. 4,314,451 (the latter patent is directed to a $CO_2$ control system in a twin agitator blender, not in a tumbler).

Liquid $CO_2$ (used to make $CO_2$ snow) and liquid nitrogen are very expensive materials, typically costing 3 to 6 cents per pound. It normally takes more than one-half pound of cryogenic to chill one pound of meat stiff enough to form it, therefore, the cost of cryogenic is a significant part of the costs of producing a formed product. It is not uncommon for a processor to spend three or four hundred thousand dollars per year on cryogenic to operate one chilling vacuum tumbler.

It is also not uncommon for a processor to waste 20% to 30% of the cryogenic because they have no accurate way to control the amount used to get the product just stiff enough to form properly. The three known control methods are (1) chill time, (2) the sound of the product tumbling around inside the tumbler drum, or (3) the temperature of the product. None of these control methods is accurate, at least as currently practiced.

The chill time method is not accurate because the flow rate of cryogenic changes dramatically depending on how full the storage tank is. Depending on the point in the unloading cycle of the storage tank, the amount of cryogenic injected into the tumbler can vary by 50% in a given time period.

The most widely used control method in industry today is to train the operator to recognize the sound the product makes tumbling inside the tumbler drum when it is the correct stiffness for forming. As the product starts to freeze, it begins to sound like gravel rolling around inside the drum. The problem with this method is it is left to the judgement of the operator which will vary from batch to batch depending on how diligent he or she is. The tendency is to chill a little more than necessary "to make sure". The result is wasting the expensive cryogenic.

Finally, the prior art temperature method is not accurate because it is only necessary to freeze 35–40% of the meat cells to get the product stiff enough to form. Since the temperature of the frozen cells is exactly the same as the temperature of the unfrozen cells, it is impossible to know the percentage of cells frozen by measuring the product temperature. Thus, the measure of temperature (alone) is not an adequate determinant of product stiffness.

A second problem which exists with chilling with cryogenics is that different products chill at different rates. In order to minimize the amount of cryogenic used, it is necessary to evenly mix the cryogenic into the product throughout the batch. All products do not mix the same and all tumbler designs do not mix the products the same. Therefore, the cryogenic cannot be injected into all products at the same rate. If the cryogenic is injected too fast, it will over-freeze pockets in the batch creating "cold spots". If the cryogenic injection is continued, these cold pockets become completely frozen using up excess cryogenic. A more efficient approach is to cycle the cryogenic flow on and off in a manner which allows the batch to chill evenly.

There is no known accurate way to determine the most efficient on/off cycle to chill the product at the most efficient rate. Cryogenic usage and chill times could be reduced if a control system could be devised which would automatically cycle the cryogenic on and off at the most efficient cycle to keep the product chilling at the most efficient rate.

SUMMARY OF THE INVENTION

The cryogenic control system of this invention measures product temperature in a cryogenic food mixing machine such as a vacuum tumbler or agitator blender to determine the time it takes for the product to be chilled down to the point where the first cells of product start to freeze (where the latent heat of fusion begins) and then stop the addition of cryogenic after a number of seconds beyond this point. In other words, the temperature at which the cells begin to freeze approximately represents the point where the product begins to stiffen. By measuring the time it takes to reach this temperature point and using that point as the reference point for determining the total time for cryogenic injection we can approximate the proper point when cryogenic should be stopped and the product can be formed properly. By measuring the length of time it takes to chill the product down to the freezing point temperature, the proper forming point can be programmed as a multiple of this time. This is an indirect way of measuring the stiffness of the product.

DETAILED DESCRIPTION OF A PREFERRED EMBODIMENT

Since the flow rate of liquid cryogenic changes from day to day depending on the tank, the length of chilling time $T_i$ to reach the point where the first cells of product start to freeze changes from day to day also. However, from day to day, the length of time required to perfectly chill a standard batch of the same product is generally the same multiple of that length of time $T_i$. It is, therefore, practical to devise a control system that measures the length of time to reach the initial freezing point $T_i$ and then multiply this time by a preprogrammed multiple to determine the precise chilling time to automatically turn off the cryogenic.

The exact multiple must be determined by test for a given product and batch size, but once determined it can be permanently programmed into the control system. Once programmed, the control system will accurately stop the flow of cryogenic at the perfect chill point batch after batch, day after day.

The inventive method can thus be characterized as follows:

A method for controlling cryogenic flow in a food mixing machine comprising the steps of:

provi ding a first measured quantity of food product into the food mixing machine;

initiating mixing of the food product in the mixing machine and delivery of liquid cryogenic onto the product, and establishing a start time therefore;

measuring the temperature as the food product is chilled by the liquid cryogenic until an initial freezing point is determined, and establishing an elapsed time $T_i$ from the start time therefore;

continuing mixing of the food product and delivery of the liquid cryogenic onto the food product until the food product has achieved forming point stiffness, and establishing an elapsed time $T_f$ from the start time therefore;

subsequently operating the food mixing machine for a second measured quantity of food product generally equal to the first measured quantity;

measuring the temperature as the second measured quantity of food product is chilled by the liquid cryogenic until an initial freezing point is determined, and establishing an elapsed time $T_{i2}$ therefore; and continuing mixing and chilling of the second measured quantity of food product for a total elapsed time $T_{f2}=T_{i2}\times T_f/T_i$.

There is a major difficulty of finding a method to accurately measure the product temperature in a tumbler. Since the tumbler drum is rotating about its axis and the product tumbles about the circumference of this drum, it is difficult to locate a temperature sensor which will be in the product continuously. One method that has been used is an infrared sensor beam which is focused on the product as the drum rotates. However, any temperature sensing method can be used, with varying accuracy.

This temperature driven concept works exactly the same in an agitated blender as described above for tumblers. It is, however, quite easy to measure the temperature of the product in a blender since the body is stationary and the temperature probe can be positioned in the center of the machine at the cusp of the tub between the agitators.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A method for controlling cryogenic flow in a food mixing machine, said method comprising the steps of:

providing a first measured quantity of food product into said food mixing machine;

initiating mixing of said food product in said food mixing machine and delivery of liquid cryogenic onto said food product in said food mixing machine, and establishing a start time therefore;

measuring the temperature as said food product is chilled by said liquid cryogenic until an initial freezing point is determined, and establishing an elapsed time $T_i$ from said start time therefore;

continuing mixing of said food product and delivery of said liquid cryogenic onto said food product until said food product has achieved forming point stiffness, and establishing an elapsed time $T_f$ from said start time therefore;

subsequently operating said food mixing machine for a second measured quantity of food product generally equal to said first measured quantity;

measuring the temperature as said second measured quantity of food product is chilled by said liquid cryogenic until an initial freezing point is determined, and establishing an elapsed time $T_{i2}$ therefore; and continuing mixing and chilling of said second measured quantity of food product for a total elapsed time $T_{f2}=T_{i2}\times T_f/T_i$.

2. The method for controlling cryogenic flow in a food mixing machine of claim 1 wherein said food mixing machine comprises a vacuum tumbler.

3. The method for controlling cryogenic flow in a food mixing machine of claim 1 wherein said food mixing machine comprises an agitator blender.

\* \* \* \* \*